(12) United States Patent
Paulus-Neues et al.

(10) Patent No.: US 6,528,918 B2
(45) Date of Patent: Mar. 4, 2003

(54) DRIVE SYSTEM

(75) Inventors: Jutta Paulus-Neues, Würzburg (DE);
Wolfgang Kundermann, Schweinfurt (DE); Armin Denner, Werneck (DE)

(73) Assignee: Mannesman Sachs AG, Schweinfurt (DE)

( * ) Notice: Subject to any disclaimer, the term of this patent is extended or adjusted under 35 U.S.C. 154(b) by 0 days.

(21) Appl. No.: 09/755,534

(22) Filed: Jan. 5, 2001

(65) Prior Publication Data
US 2001/0015584 A1 Aug. 23, 2001

(30) Foreign Application Priority Data
Jan. 5, 2000 (DE) .......................... 100 00 253

(51) Int. Cl.[7] ............................ H02K 7/02; H02K 47/14
(52) U.S. Cl. .................................... 310/75 R; 370/113
(58) Field of Search ............................ 370/75 R, 76, 370/78, 79, 84, 75 D, 92, 102 R, 102 A, 118, 119, 112, 113, 114; 123/179.1, 179.25, 179.26; 290/46, 47, 48

(56) References Cited

U.S. PATENT DOCUMENTS

| 4,528,470 | A | * | 7/1985 | Young et al. ................. 310/78 |
| 4,958,095 | A | * | 9/1990 | Uchida et al. ........... 123/41.31 |
| 5,103,127 | A | * | 4/1992 | Peter ........................ 123/179.1 |
| 5,262,693 | A | * | 11/1993 | Holka ........................ 310/121 |
| 5,796,195 | A | * | 8/1998 | Miyakawa ................. 310/261 |
| 6,133,659 | A | * | 10/2000 | Rao .............................. 123/3 |
| 6,215,213 | B1 | * | 4/2001 | Forster et al. ............... 310/51 |

* cited by examiner

Primary Examiner—Dang Pinh Le
(74) Attorney, Agent, or Firm—Cohen, Pontani, Lieberman & Pavane

(57) ABSTRACT

A drive system includes an electric machine with a rotor arrangement which is connectable to a drive shaft for joint rotation therewith and a stator arrangement. The drive system further includes a coupling device such as a hydrodynamic coupling device with an inlet region that is connectable to the drive shaft for joint rotation therewith. A coupling element that is connectable to the drive shaft supports a rotor interaction region of the rotor arrangement is connectable to the inlet region of the coupling device for joint rotation.

11 Claims, 5 Drawing Sheets

DRIVE SYSTEM

BACKGROUND OF THE INVENTION

1. Field of the Invention

The present invention relates to a drive system including an electric machine and a coupling device, the electric machine having stator arrangement and a rotor arrangement and the coupling device having an inlet region, wherein the rotor arrangement and the inlet region are connectable to a drive shaft for joint rotation about an axis of rotation.

2. Description of the Related Art

In drive systems having an electric machine with a rotor arrangement connected to a drive shaft, the electric machine typically comprises a starter/generator arrangement. In an active state, the electric motor acts as a starter arrangement to generate a torque which is transmitted to the drive shaft to start an internal combustion engine. In this active state, the electric machine may also be used to supplement the torque provided by the internal combustion engine by delivering a backup torque or a drive torque. In another state, the electric machine may also be used as a generator for generating electric power and/or actively damping vibrations when the driveshaft is driven by another drive machine such as the internal combustion engine. Because of the limited space available in motor vehicles, a goal of such drive arrangements is to achieve as small an overall size as possible in conjunction with the greatest possible power capability. The general result of this is that the various known drive system assemblies are designed with the smallest possible overall axial length. However, electric machines having larger power capabilities are desired.

SUMMARY OF THE INVENTION

An object of the present invention is to provide a drive system having a very small overall axial size that is also easy to mount.

According to the present invention, the object is achieved by a drive system having an electric machine with a rotor arrangement connectable to a drive shaft for joint rotation therewith and a stator arrangement. The drive system further includes a coupling device such as, for example, a hydrodynamic coupling device with an inlet region that is also connectable to the drive shaft for joint rotation therewith. To effect the connection between the coupling device and the drive shaft, the drive system includes a coupling element connectable to the drive shaft and is connected to a rotor interaction region of the rotor arrangement. The coupling element is also connectable to the inlet region of the coupling device for joint rotation therewith.

Accordingly, the coupling element of the drive system according to the present invention which supports the rotor interaction region of the rotor arrangement simultaneously couples the coupling device and the drive shaft. Accordingly, separate coupling assemblies for the rotor interaction region and the coupling device are not required and the coupling device may be arranged axially closer to the electric machine.

The rotary connection between the coupling element and the coupling device may be produced by providing a first engagement formation on the coupling element and a second engagement formation at the inlet region of the coupling device. The first engagement formation and the second engagement formation are axially moveable toward one another to produce a mutual circumferential driving engagement.

One engagement formation of the first and second engagement formations has a plurality of engagement projections which axially engage between two mating driving projections or in a mating driving recess of the other engagement formation of the first and second engagement formations for producing the circumferential driving engagement.

The first and second engagement formations may be designed as Hirth toothings, i.e., serrated toothing. A self-centering effect is obtained by engagement of the Hirth toothings. To retain the engagement of the first and second engagement formations, an engagement holding arrangement is arranged for holding the circumferential driving engagement state of the first and second engagement formations.

The engagement holding arrangement may, for example, include a holding element arranged on one of the coupling element and the rotor interaction region so that the holding element is rotatable relative to the one of the coupling element and the rotor interaction region and supported in the axial direction. The holding element has a third engagement formation. A fourth engagement formation is arranged on the other of the coupling element and the rotor interaction region. The holding element is rotatable relative to the one of the coupling element and the rotor interaction region for bringing the third engagement formation into a holding engagement with the fourth engagement formation.

In one embodiment, the holding element has an essentially sleeve-like engagement section on which the third engagement formation is arranged. The holding element further includes a support section which extends essentially radially and can be supported axially relative to the one of the coupling element and the rotor interaction region. The third and the fourth engagement formations may be arranged for producing a threaded engagement state. The threaded engagement state does not require that the holding element be situated at a specific rotary position to obtain a defined axial coupling.

However, the third and the fourth engagement formations may alternatively be arranged to produce a bayonet lock engagement state.

A tool attachment may be arranged on the holding element for facilitating the rotation of the holding element for bringing the third and fourth engagement formations into the holding engagement to produce an axial retention. The holding element may be locked against rotation with reference to one of the coupling element and rotor interaction region to prevent the undesired release of the holding engagement even during vibrations occurring during operation.

To further reinforce the axial cohesion between the coupling element and the coupling device, i.e., to prestress the coupling element and the coupling device relative to one another, at least a portion of the holding element may be elastically deformed.

The coupling element may be formed as a circular plate. In this embodiment, the first engagement formation is formed by engagement projections which project axially from the coupling element. The engagement projections are preferably formed by reforming.

To compensate and/or absorb wobbling movements which may occur in the region of the coupling device during operation, the coupling element may be formed from a flexible material such as, for example, sheet stock.

The present invention also relates to a mounting device for mounting an electric machine for a drive system, the electric machine having a rotor arrangement which is to be connected to a drive shaft for joint rotation, and a stator arrangement which is to be connected to a fixed assembly.

Electric machines such as synchronous machines with permanent magnets are assembled with only a small air gap between the interaction region of the rotor arrangement and the interaction region of the stator arrangement for increasing the efficiency of the electric machine. The permanent magnets arranged, for example, on the rotor arrangement, exert an attractive force on the stator arrangement. Accordingly, there is a risk that the stator arrangement will be attracted onto the rotor arrangement and adhere to the latter during assembly. Damage to one of the assemblies may occur while the assemblies are detached.

For this reason, the invention provides a mounting device for use during a mounting operation in which the undesired adhering to one another of, or mutual contact between the rotor arrangement and stator arrangement, can be reliably prevented. For this purpose, the mounting device comprises a first guide arrangement which is arrangeable in a fixed fashion relative to the stator arrangement, a second guide arrangement provided on the rotor arrangement. The second guide arrangement interacts with the first guiding arrangement when the rotor arrangement is brought up axially toward the stator arrangement such that the rotor arrangement is guided relative to the stator arrangement when the rotor arrangement is displaced into its assembled position. Once the assembles position has been achieved, the interaction between the first guide arrangement and the second guide arrangement is releasable and the second guide arrangement may be removed from the rotor arrangement.

The second guide arrangement may comprise a plurality of guide pins which are releasably provided on the rotor arrangement and extending essentially in one guiding direction. In this embodiment, the first guide arrangement has a guide opening corresponding to each guide pin in which a respective guide pin engages to-guide the rotor arrangement relative to the stator arrangement in the guiding direction.

To carry out the mounting operation as easily as possible, the guide pins may be borne on a guide pin carrier. This ensures that individual guide pins are not left inadvertently in the system which could lead to damage in an overall drive train in which the system is mounted.

The guide pin carrier includes a mounting prevention arrangement to prevent further assemblies from being connected to the rotor arrangement and stator arrangement before any aids used to facilitate the mounting which are not intended to remain in the system have been removed. The mounting prevention arrangement prevents the subsequent coupling of the rotor arrangement to a further assembly, preferably a coupling device, when the second guide arrangement is not removed after the rotor arrangement and stator arrangement have been joined.

A coupling element of the rotor arrangement may include a feedthrough opening for each guide pin through which a respective guide pin may be guided for the purpose of releasably assembling the rotor arrangement with the second guide arrangement.

The present invention further relates to an electric machine for a drive system comprising a rotor arrangement arranged for being coupled to a drive shaft for joint rotation therewith and a stator arrangement arranged for being coupled to an essentially fixed assembly. The stator arrangement has a stator support having at least one stator support part formed from sheet stock and is connectable to the fixed assembly. The stator arrangement further includes a stator interaction region arranged on the stator support.

The stator support of the electric machine is very easy to produce which lowers the overall costs for such a machine.

In a further embodiment, the stator support comprises a first support part and a second support part, of which at least one is formed from sheet stock. The first support part and the second support part are connected in a first radial inner region to one another and to the essentially fixed assembly. The first and second support parts are connected in a second radially outer region to one another and to the stator interaction region.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
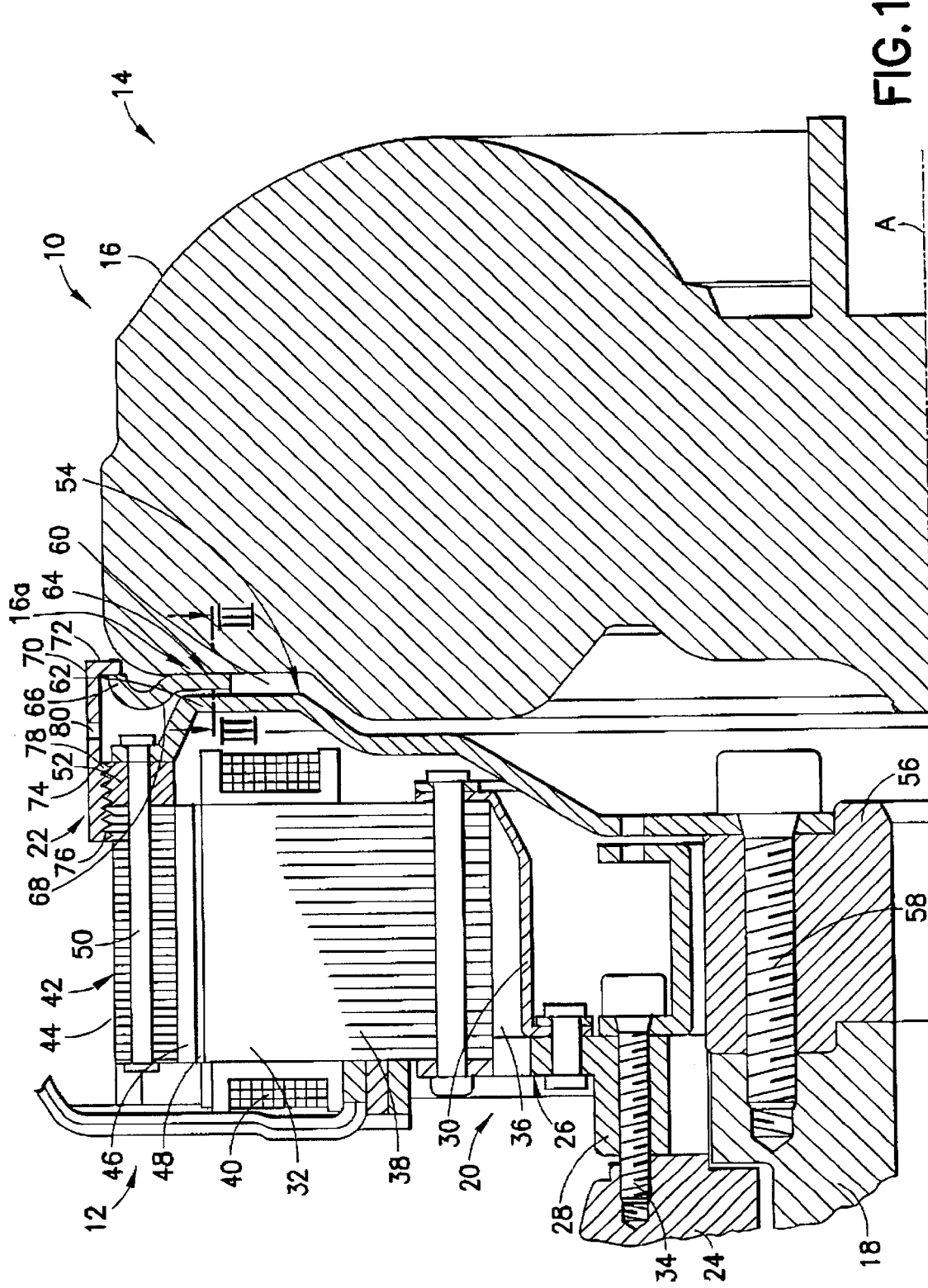
FIG. 1 is a diagrammatic partial longitudinal sectional view of a drive system according to the invention showing an electric machine and a coupling device are already coupled for the purpose of joint rotation.

A drive system 10 according to the present invention is shown in FIG. 1 and includes an electric machine 12 and a coupling device 14. This coupling device 14 is illustrated only diagrammatically in the Figures and is shown in the form of its housing 16 visible to the outside. The coupling device 14 may, for example, comprise a hydrodynamic torque converter or a fluid coupling. The housing 16 is connected securely in terms of rotation in a way described below to a drive shaft 18 which may, for example, comprise a crankshaft. A turbine wheel (not shown in the Figures) arranged inside the housing 16 is connected to an output shaft such as, for example, a transmission input shaft. The design of such hydrodynamic coupling devices is known in the prior art and is not described further herein.

The electric machine 12 includes a stator arrangement 20 and a rotor arrangement 22. The stator arrangement 20 is connected to a fixed member or to a fixed assembly 24 such as, for example, an engine housing. The stator arrangement 20 comprises a stator support 26 for connection to the fixed assembly 24. The stator support 26 comprises two support parts 28, 30 having radially inner regions that are permanently connected to one another and having radially outer regions that are connected to an interaction region 32 of the stator arrangement 20. The connection of the two support parts may, for example, comprise riveting. The stator support 26 and the support parts 28, 30 or one of these support parts 28, 30 may be formed by reforming a sheet-metal part resulting in a cost-effective design. The stator support 26 is then fixed on the assembly 24 by a plurality of threaded bolts 34. A chamber 36 is formed in the interior of the stator support 26 for receiving the introduction of cooling fluid.

The stator interaction region 32 comprises a laminated core 38 with a plurality of coils 40 to generate a magnetic field.

An interaction region 42 of the rotor arrangement 22 is arranged so that it surrounds the radial outer side of the interaction region 32 of the stator arrangement 20. The rotor interaction region 42 comprises a plurality of sheets 44 which form a yoke for permanent magnets 46 which are supported on the radial inner side of the sheets 44. A small air gap 48 is formed between the permanent magnets 46 and the stator interaction region 32 which is designed to be as small as possible to increase the efficiency of the electric machine 12.

The interaction region 42 of the rotor arrangement 22 is supported by a plurality of rivet studs 50 or other fasteners with a spacer disk 52 arranged between the interaction region 42 and a coupling element 54 of the rotor arrangement 22. The coupling element 54 is designed as a plate and may, for example, be formed as a circular plate stamped from sheet stock and then reformed. A radial inner side of the coupling element 54 is fixed on the drive shaft 18 via a spacer sleeve 56 by a plurality of threaded bolts 58. As depicted in FIG. 1, centering shoulders may be arranged between the coupling element 54 and the spacer sleeve 56 and between the spacer sleeve 56 and the drive shaft 18 to allow the couping element 54, spacer sleeve 56, and the drive shaft 18 to be correctly positioned relative to one another.

Figure 3:
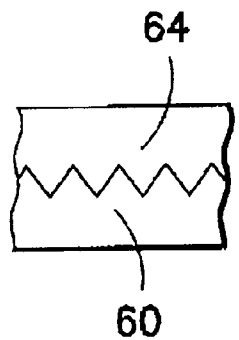
FIG. 3 is a sectional view along line III—III of FIG. 1.

The coupling element 54 couples the rotor interaction region 42 to the drive shaft 18 rotation and also simultaneously couples the drive shaft 18 to the housing 16 at an inlet region 16a of the coupling device 14. The coupling element 54 has a first engagement formation 60 comprising a plurality of coupling projections 62 which are arranged sequentially in the circumferential direction. The coupling projections 62 may be arranged as Hirth toothing and so that they have a circumferential width that widens from a radially inner side to a radially outer side (see FIG. 8). Furthermore the coupling projections 62 may be arranged so that they taper in the axial direction toward the housing 16 (See FIG. 3). A second engagement formation 64 is arranged on the housing 16 corresponding to the first engagement formation 60. This second engagement formation 64 includes a drive element 66 arranged between the housing 16 and the coupling element 54. The drive element 66 may be annular or may comprise a plurality of separated element sections distributed in the circumferential direction on the housing 16 and fixed thereto, for example, by welding. The second engagement formation 64 has a plurality of drive projections 68 which are shaped in a complementary fashion to the drive projections 62 of the first engagement formation 60. The first and second engagement formations 60, 64 are formed so that they enter a meshed engagement with one another upon axial approach of the housing 16 and the coupling element 54 toward each other. The meshed engagement of the coupling projections 62 and the drive projections 68 may be arranged as a Hirth toothing with a taper in the axial direction to provide a self-centering effect and to avoid circumferential movement play of the meshed engagement.

The first and second engagement formations 60, 64 may be produced when forming the elements 54, 66, so that a very stable configuration is obtained by reforming sheet-metal parts. The projections 62, 68 may alternatively be designed with edges running parallel to one another radially outward.

As depicted in FIG. 1, the radially outer region of the drive element 66 is arcuately rounded off. The drive element 66 supports a holding element 70 relative to the coupling device 14. The holding element 70 has a flange-like, radially inwardly projecting holding projection 72 which is arranged axially between the drive element 66 and the housing 16, thereby preventing release of the holding element 70 from the coupling device 14. During assembly, the holding element 70 must be brought up to the housing 16 before the coupling element 66, so that the holding projection 72 is arranged between the drive element 66 and the housing 16 when the drive element 66 is fixed on the housing 16. The holding element 70 further includes a sleeve-like holding section 74. A third engagement formation 76 is arranged on an inner circumferential surface of the sleeve-like holding section 74 and may, for example, comprise an internal thread. A fourth engagement formation 78 is arranged on the spacer disk 52 and shaped in a complementary fashion to the third engagement formation 76 of the holding element 70 such as, for example, an external thread. The spacer disk 52 has an annular shape and, as may be seen in FIG. 1, is arranged proximate the coupling element 54. The spacer disk 52 may also be permanently connected to the coupling element. The fourth engagement formation 78 may also be arranged on the outer circumferential region of the coupling element 54 as depicted in FIG. 1.

When the electric machine 12 and the coupling device 14 are being joined, the coupling device 14 is moved toward the electric machine 12 along the rotation axis A after the electric machine 12 has been mounted on a drive unit. The coupling device 14 is moved until the such that the first and second engagement formations 60, 64 are in a meshed engagement. Thereafter, or during this bringing-up movement, the third and fourth engagement formations 76, 78 are brought into engagement with one another by rotating the holding element 72 relative to the coupling device 14. For example, when the third and fourth engagement formations 76, 78 are designed like threads, the holding element 70 is rotated so that it is necessarily displaced axially with reference to the rotor arrangement 22. The axial movement of the holding element 70 draws the coupling device 14 closer to the electric machine 12. The holding section 74 has several tool engagement openings 80 for receiving a tool which is inserted therein from radially outside to facilitate rotating the holding element 70 in the circumferential direction.

Figure 4:
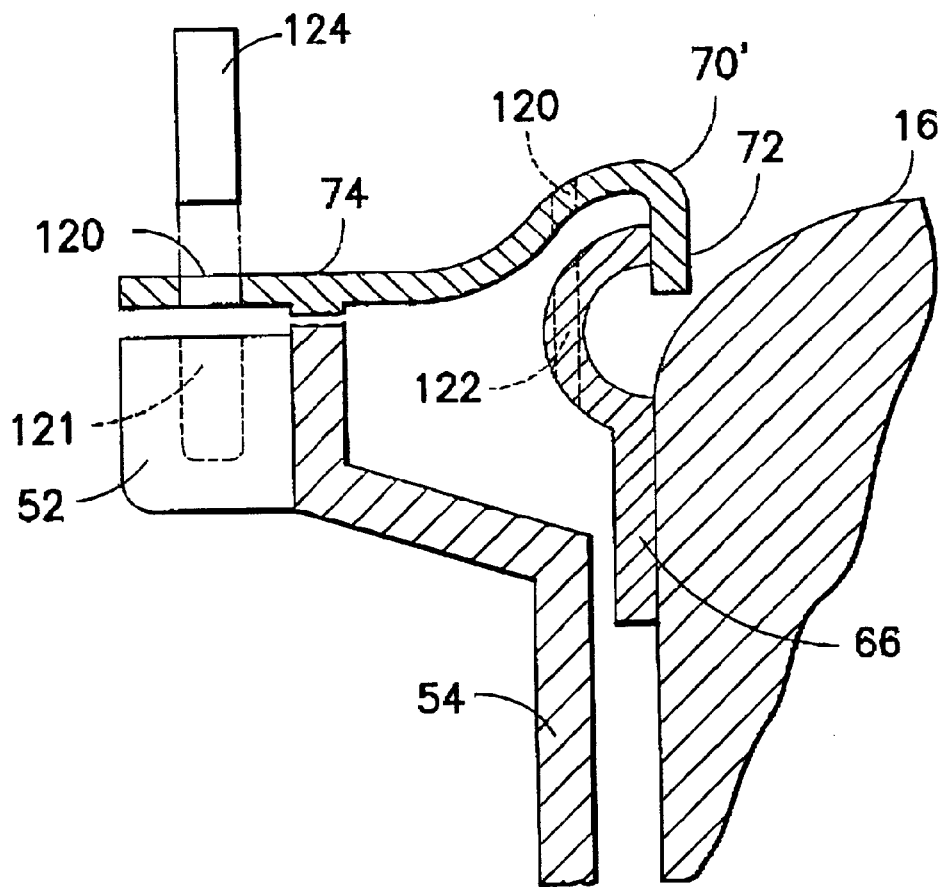
FIG. 4 is a detailed view of another embodiment showing the coupling element forge coupling device and the electric machine.

The holding element 70 may be locked against further rotation in the circumferential direction to ensure that the engagement of the first and second engagement formations 60, 64 is maintained. For this purpose, radially outwardly open feedthrough openings 120 are arranged in the holding element 70 and in the spacer element 52 and the drive element 66 (see FIG. 4). At least one of the openings 120 in the holding element 70 is aligned with openings 121, 122 provided on the drive element 66 and the spacer element 52 and a securing pin is inserted therethrough to lock the holding element against further rotation. Although the openings 120 are shown as being arranged at both the spacer element 52 and the drive element 66, the openings may alternatively be arranged at only one of these elements. FIG. 4 also shows that the holding element 70 may have a certain elasticity in the transition region between the holding section 74 and the holding projection 72 such that the drive element 66 is pressed axially against the coupling element 54 under elastic prestressing of the holding element 70. The elasticity may be arranged in the transition region by arcuate reforming similar to the radially outer region of the drive element 66. Of course the drive element 66 may also comprise a specific elasticity due to its arcuate configuration so that a prestressing force for holding the drive element 66 and the coupling element 54 in engagement is produced within the drive element 66.

Figure 5:
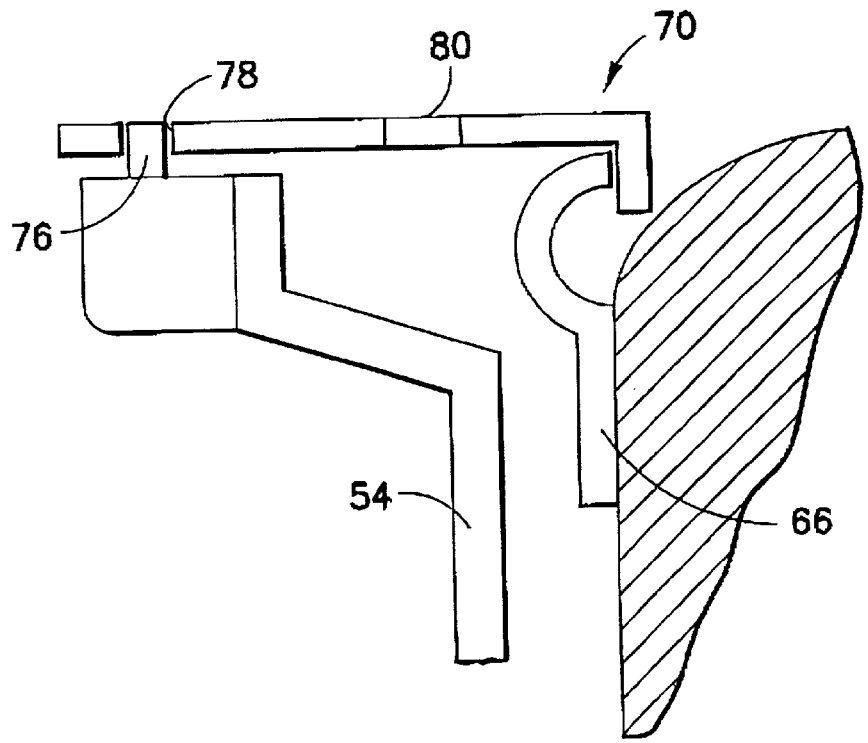
FIG. 5 is a detailed view similar to FIG. 4 of another embodiment of the present invention.
Figure 6:
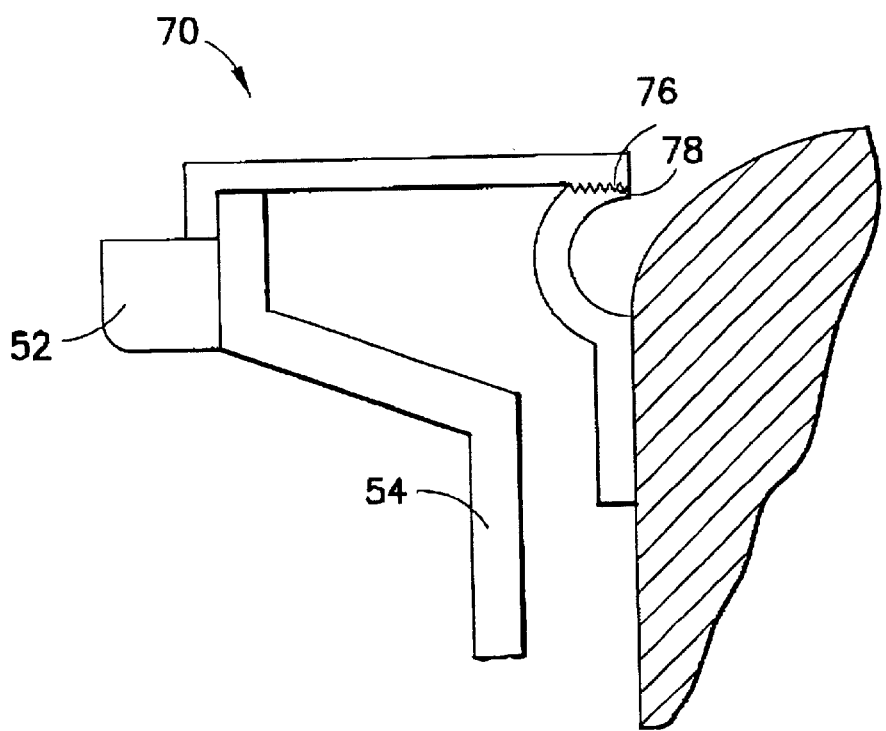
FIG. 6 is a detailed view similar to FIG. 4 of yet another embodiment of the present invention.

The holding element 70 may be modified in various ways. For example, in FIG. 5 the third and fourth engagement formations 76, 78 may comprise a bayonet connection, such that a limited rotation in the circumferential direction with a latching action then produces the axial holding of the electric machine 12 and the coupling device 14. Furthermore, FIG. 6 shows that the holding element 70 may be supported on the radial outward regions of the coupling element 54 with the fourth engagement formation 78 arranged on the outer circumferential region of the drive element 66.

Figure 7:
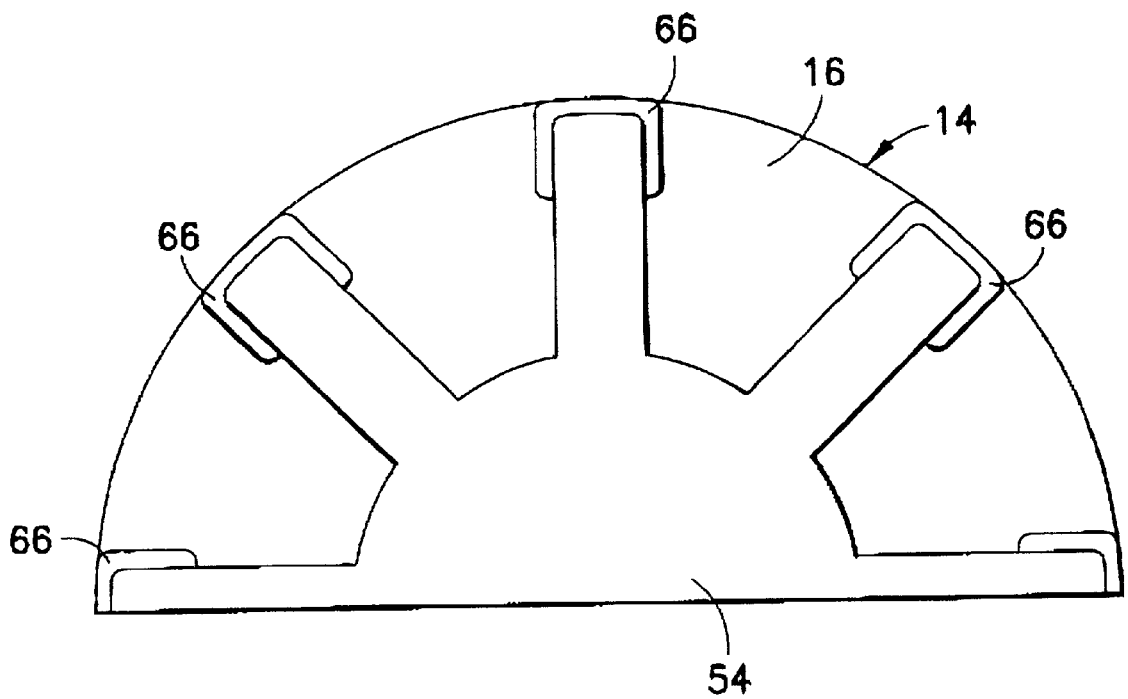
FIG. 7 is a front view of the upper half of coupling element arranged on a coupling device according to an embodiment of the present invention.
Figure 8:
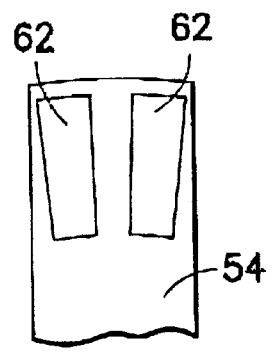
FIG. 8 is a rear view of one arm of the coupling element of FIG. 7.

Furthermore, instead of designing the coupling element 54 as a circular plate of continuous construction in the circumferential direction, the coupling element 54 may also be designed with arm sections in its radially outer region which respectively includes at least one coupling projection 62 as shown in FIGS. 7 and 8. The first and the second engagement formations 60, 64, may include depressions instead of projections which project over the remaining region of the plate part. Nevertheless, a projection region projecting over the base of the depressions is then again formed, for the purpose of forming the meshed engagement between the first and second engagement formations.

When the drive element 54 is designed as a flexible plate as is used in general for connecting hydrodynamic torque converters to drive shafts securely, the drive element 54 is also capable of compensating wobbling movements which occur, for example, in the region of the coupling device 14 or swellings of the housing 16 owing to the fluid pressure prevailing in the interior of the same. That is, the drive element is capabale of decoupling the wobbling movements and swellings from the drive shaft 18. If such wobbling movements occur, the rotor interaction region 42 tilts together with the housing 16 with reference to the rotation axis A. However, the tilting is only permissible in a limited region, because the mutual contact between the rotor interaction region 42 and the stator interaction region 32 is deterimental to the electric motor 12. If the interaction regions 32, 42 are axially longer than shown in FIG. 1, the coupling element 54 may be arranged as a rigid member. In this embodiment, the decoupling of the wobbling movement between the rotor interaction region 42 and the housing 16 of the coupling device 14 is effected by the above-described elasticity in the region of the holding element 70 and in the region of the drive element 66. Furthermore, a plurality of projections or depressions may be arranged on the holding element 70 so that a tachometer-generator formation with a fixed sensor arrangement such as a magnetic pickup may be arranged for detecting the rotational speed of the system.

Figure 2:
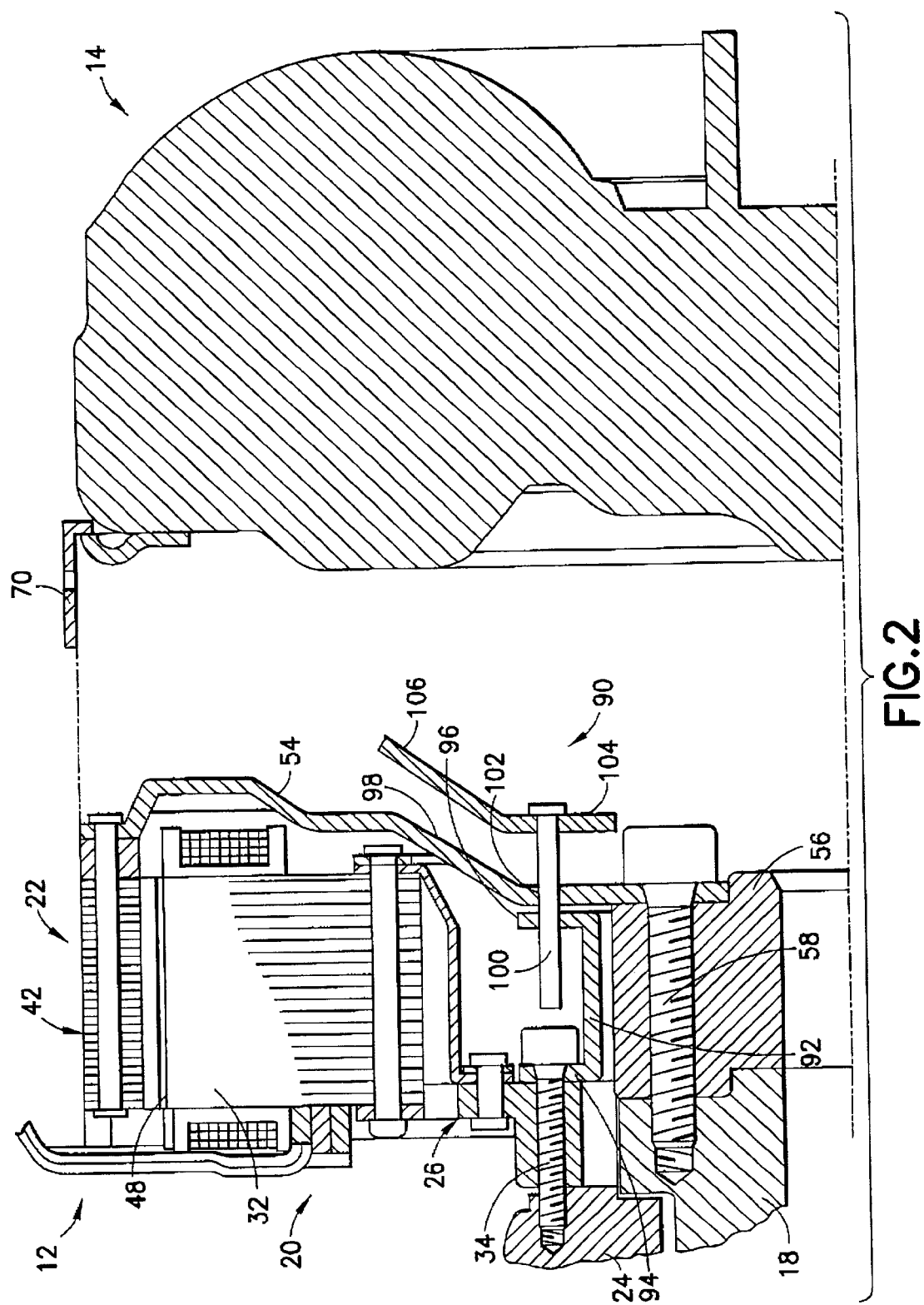
FIG. 2 is a view similar to that of FIG. 1 in which the electric machine is assembled and the coupling device is in a disconnected state.

In FIG. 2, the drive system 10 according to the present invention is shown during an assembly mode in which a mounting tool 90 is used to facilitate assembly of the electric machine 12. A guide sleeve 92 is fixed with respect to the fixed assembly 24 by the threaded bolts 34 together with the stator support 26 and therefore with the overall stator arrangement 20. An axial end region of the guide sleeve 92 facing the fixed assembly 24 has a flange-like projection 94 through which the threaded bolts 34 are screwed. In the other axial end region of the guide sleeve 92, a further flange-like region 96 projects radially outward and is either interrupted in those regions in which axial access to the threaded bolts 34 must exist, or has through-openings there. The further flange-like projection 96 has a plurality of guide openings 98 arranged along the circumferential direction.

When the rotor arrangement 22 is joined to the stator arrangement 20, a guide pin 100 is inserted into each of these guide openings 98. These guide pins 100 arranged sequentially in the circumferential direction and respectively penetrate an opening 102 arranged in the coupling element 54. The guide pins are arranged jointly on a guide pin carrier 104. For joining the rotor arrangement 22 and the stator arrangement, the guide pins 100 are arranged on the guide pin carrier 104 and jointly inserted into the openings 102 in the coupling element 54 until the guide pin carrier 104 strikes against the coupling element 54. Thereafter, the assembly including the mounting tool 90, coupling element 54 and the rotor interaction region 42, is moved axially either together with the spacer ring 56 or after the the spacer ring 56 has already been positioned on the drive shaft 18 such that the guide pins 100 enter the guide openings 98. Since a relatively large number of such guide pins 100 are provided and the guide pins 100 are held by the guide pin carrier 104 in a defined position, the guide pins 100 are used to guide the movement of the rotor arrangement 22 with reference to the stator arrangement 20 in a defined fashion. The length of the guide pins 100 must be long enough so that the guide pins 100 enter the guide openings 98 before the rotor interaction region 42 axially overlaps the stator interaction region 32. After the guide pins 100 have entered the guide openings 98, the rotor arrangement 22 together with the mounting tool 90 is axially displaceable until the assembled position if the rotor arrangement shown in FIG. 2 is obtained. Of course, the rotor arrangement 22 may be axially displaced while the the mounting tool 90 is held fixed with reference to the stator arrangement 20 until the assembled position illustrated in FIG. 2 is obtained. After the rotor arrangement 22 is in the assembled position, the threaded bolts 58 are screwed in to complete the assembly of the electric machine 12. Because of the exact guidance provided, the mounting tool 90 allows the electric machine 12 to be assembled with a very small air gap 48 so that the electric machine 12 has a higher efficiency and without the risk of damaging the stator arrangement 20 and or the rotor arrangement 22 during assembly.

After assembly of the electric machine 12 using the guide pins 100, it is mandatory for all the guide pins 100 and the mounting tool 90 to be removed from the rotor arrangement 22, because the guide pins 100 would fundamentally prevent freedom of rotation of the rotor arrangement 22 with reference to the stator arrangement 20. To ensure that the electric machine 12 cannot be joined to the coupling device 14 before the mounting tool 90 has been removed, the mounting tool 90 has an axially projecting region 106 which projects into a region which the coupling device 14 occupies in the coupled state. In other words, if the mounting tool 90 has not been removed, the coupling device 14 cannot be brought into the required axial position with reference to the electric machine 12. Thus, it is necessary to remove the mounting tool 90 with the guide pins 100 before assembling the electric machine 12 axially with the coupling device 14 in accordance with the above described connection process.

After removal of the coupling device 14 from the electric machine, the mounting tool 90 may also be used for repair work in which the electric machine 12 must be disassembled. Of course, the mounting device 90 may also include separate mounting pins 100 which are individually inserted and removed. However, the preferred embodiment includes assembling these guide pins 100 on the guide pin carrier because of the simpler handling.

The present invention provides a drive system with an electric machine and a coupling device which can be assembled with a short axial design because of the high system integration. To allow the short axial design, the coupling device and the interaction region of the rotor arrangement are connected by a common coupling element to a drive shaft. A mounting operation which is very easy to perform while assembling the electric machine with the coupling device is accomplished by mutually axially engaging engagement arrangements on the coupling element and on the coupling device and by a holding element which maintains this axial engagement.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive system for connection to a drive shaft, comprising:

an electric machine having a rotor arrangement arranged for rotating about an axis of rotation and a stator arrangement;

a coupling device having an inlet region; and a coupling element operatively arranged for connection to the drive shaft, said rotor arrangement having a rotor interaction region operatively connected to said coupling element such that said rotor interaction region is supported by said coupling element, and said inlet region of said coupling device being connectable to said coupling element for rotation therewith about the axis of rotation, said coupling element comprising a first engagement formation and said inlet region of said coupling device comprising a second engagement formation, said first engagement formation being operatively arranged for engagement with said second engagement formation when said second engagement formation is moved toward said first engagement formation, the engagement forming a mutual circumferential driving engagement between said coupling element and said inlet region; and an engagement holding arrangement operatively arranged for holding said first and second engagement formations in the circumferentially driving engagement, wherein the engagement holding arrangement comprises:

a holding element operatively axially supported on and arranged for rotating relative to one of said coupling element and said inlet region, said holding element having a third engagement formation; and a fourth engagement formation arranged on the other one of said coupling element and releasably engagable in a holding engagement with said third engagement formation via rotation of said holding element relative to the one of said coupling element and said inlet region.

2. The drive system of claim 1, wherein one engagement formation of said first and second engagement formations comprises a plurality of engagement projections and the other engagement formation of said first and second engagement formations comprises one of mating driving projections and mating driving depressions with which said plural engagement projections engage for forming the circumferential driving engagement.

3. The drive system of claim 1, wherein said first and second engagement formations comprise Hirth toothings.

4. The drive system of claim 1, wherein said holding element further comprises a sleeve-like engagement section and a support section comprising a radial extension for axial support relative to said one of said coupling element and said inlet region, said third engagement formation being operatively arranged on said sleeve-like engagement formation.

5. The drive system of claim 1, wherein the holding engagement between said third and the fourth engagement formations comprises a threaded engagement state.

6. The drive system of claim 1, wherein said holding engagement between said third and the fourth engagement formations comprises a bayonet lock engagement state.

7. The drive system of claim 1, further comprising a tool attachment formation arranged on said holding element for facilitating the rotation of holding element for forming said holding engagement between said third and fourth engagement formations.

8. The drive system of claim 1, wherein said holding element comprises means for locking said holding element against rotation relative to at least one of said coupling element and said inlet region.

9. The drive system of claim 1, wherein said holding element comprises at least one elastically deformable region.

10. The drive system of claim 1, wherein said coupling element comprises a circular plate and said first engagement formation comprises engagement projections arranged for projecting axially from said coupling element and formed by reforming of said circular plate.

11. The drive system of claim 1, wherein said coupling element comprises a flexible material.

* * * * *